United States Patent
Isono et al.

(10) Patent No.: US 6,428,396 B2
(45) Date of Patent: Aug. 6, 2002

(54) METHOD OF PRODUCING A SUBSTRATE FOR AN INFORMATION RECORDING MEDIUM AND METHOD OF PRODUCING AN INFORMATION RECORDING MEDIUM

(75) Inventors: Hideki Isono; Hiroshi Takeda; Hisao Kawai, all of Tokyo (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 09/892,854

(22) Filed: Jun. 28, 2001

(30) Foreign Application Priority Data

Jun. 29, 2000 (JP) .................................... 2000-196212
Jun. 29, 2000 (JP) .................................... 2000-196377
Jun. 29, 2000 (JP) .................................... 2000-196516

(51) Int. Cl.$^7$ ................................................ B24B 1/00
(52) U.S. Cl. ........................................ 451/41; 451/559
(58) Field of Search ............................ 451/41, 36, 60, 451/28, 559

(56) References Cited

U.S. PATENT DOCUMENTS 6,106,754 A * 8/2000 Cook et al. .................... 451/56

6,191,040 B1 * 2/2001 Glass ............................ 451/36
6,238,272 B1 * 5/2001 Tanaka et al. ................. 451/41

FOREIGN PATENT DOCUMENTS

JP          02-285508          11/1990

* cited by examiner

Primary Examiner—Joseph J. Hail, III
Assistant Examiner—Hadi Shakeri
(74) Attorney, Agent, or Firm—Sughrue Mion, PLLC

(57) ABSTRACT

A method of producing a substrate for an information recording medium in which there is a step of washing and drying the substrate, which is also subjected to precision polishing. In the method, a correlation is preliminarily obtained between a contact angle of water on a surface of the substrate before the washing/drying step and a size (height) of protrusions attached to the surface of the substrate during the washing/drying step. The contact angle of water on the surface of the substrate before the washing/drying step is controlled so that the protrusions have a size (1) so as not to cause a hit when at least a recording layer is formed on the surface of the substrate and when a slider provided with a recording device and/or a reproducing device is made to run on a surface of the information recording medium, and (2) so as not to cause an error upon recording and/or reproducing the information recording medium.

14 Claims, 2 Drawing Sheets

METHOD OF PRODUCING A SUBSTRATE FOR AN INFORMATION RECORDING MEDIUM AND METHOD OF PRODUCING AN INFORMATION RECORDING MEDIUM

BACKGROUND OF THE INVENTION

This invention relates to a method of producing an information recording medium for use as a recording medium for an information processing apparatus and to a method of producing a substrate for the information recording medium. This invention also relates to the information recording medium for use as the recording medium and to the substrate for the information recording medium.

A magnetic disk is known as one of information recording media for use as a recording medium for an information processing apparatus. The magnetic disk comprises a substrate and a thin film such as a magnetic layer formed thereon. With a recent demand for an increase in recording density, a flying height which is a distance between the magnetic disk and a magnetic head has a very small value, for example, equal to 30 nm or less. As a consequence, it is desired to provide a substrate having a surface high in flatness and smoothness. The substrate having a surface high in flatness and smoothness can be obtained by appropriately selecting a polishing pad used in a polishing step or by reducing a particle size of abrasive grains used in the polishing step.

In addition to the improvement in flatness and smoothness of the surface of the substrate, the magnetic head is improved from a thin film head to a magnetoresistive head (MR head) and a giant magnetoresistive head (GMR head) utilizing an anisotropic magnetoresistance in order to meet the increase in recording density.

As described above, the high flatness of the surface of the magnetic disk is essential and indispensable in order to achieve a low flying height required to increase the recording density. In case where the MR head is used, the surface of the magnetic disk is required to be high in flatness and smoothness in view of thermal asperity also. The thermal asperity is a phenomenon such that, if a protrusion is present on the surface of the magnetic disk, the MR head is affected by the protrusion to generate heat and, as a consequence, the MR head becomes unstable in resistance value to cause malfunction in electromagnetic conversion.

Thus, in order to reduce the flying height of the magnetic head and to prevent occurrence of the thermal asperity, the demand for the high flatness and the high smoothness of the surface of the magnetic disk is more and more increasing day by day.

However, at the present stage, the increase in recording density of the magnetic disk can not be achieved only by polishing the surface of the substrate with high precision. Even if high-precision polishing is performed, protrusions may thereafter be formed on the substrate due to presence of foreign matters. In this event, the high flatness and the high smoothness of the magnetic disk can not be achieved. In fact, the removal of the protrusions due to presence of the foreign matters is already performed. However, the protrusions on the substrate, which are very small and need not be removed in the past, cause a serious problem at a present level of the increase in recording density.

If the thin film such as the magnetic layer is deposited on the substrate with the protrusions of the type attached to the surface of the substrate, protrusions are formed on the surface of the magnetic disk to become a factor inhibiting the reduction in flying height of the magnetic head and the prevention of occurrence of the thermal asperity (prevention of occurrence of a recording or a reproducing error).

Likewise, if the thin film such as a recording layer is deposited on the substrate with the protrusions of the type attached to the surface of the substrate, protrusions are formed on the surface of the information recording medium to become a factor causing a defect such as the recording or the reproducing error.

SUMMARY OF THE INVENTION

It is an object of this invention to provide a method of producing a substrate for an information recording medium, which is capable of suppressing and preventing a protrusion from being formed on a substrate to act as a factor inhibiting a reduction in flying height of a magnetic head and a prevention of occurrence of thermal asperity and/or as a factor causing a defect in an information recording medium.

It is another object of this invention to provide a method of producing an information recording medium using the above-mentioned substrate.

It is still another object of this invention to provide a substrate for an information recording medium which is capable of suppressing the influence of protrusions acting as a factor inhibiting a reduction in flying height of a magnetic disk and a prevention of occurrence of thermal asperity and/or as a factor causing a defect in the information recording medium.

It is a further object of this invention to provide an information recording medium using the above-mentioned substrate.

The present inventors found out that, even if a substrate is washed and dried in a washing/drying step, some protrusions may be left without being diminished and that, if a thin film such as a magnetic layer is deposited on the substrate with the protrusions attached to the surface of the substrate, protrusions are formed on the surface of a magnetic disk to become a factor inhibiting a reduction in flying height of a magnetic head and a prevention of occurrence of thermal asperity.

It has also been found out that the protrusions contain at least one of C, O, Al, Si, Fe, Cu, Zn, and Zr present in a cleaning liquid or an atmosphere.

The present inventors have investigated the reason why the protrusions containing the above-mentioned element or elements are attached to the substrate. As a consequence, it has been found out that, if the surface of the substrate is washed or rinsed with water and thereafter dried, the protrusions are left on the substrate at local spots where the water is deposited and then dried. It has also been found out that some of the protrusions containing the above-mentioned element or elements can not be removed by various washing techniques and can only be removed by polishing the substrate again.

As the water used in the washing/drying step, use is generally made of filtered water, DI water (deionized water), and the like. The washing/drying step is carried out in a clean atmosphere within a clean room or in an atmospheric air. The water or the atmosphere mentioned above contains C, Al, Si, Fe, Cu, Zn, Zr, and the like. It has been found out that the water containing such element or elements, in combination with the surface condition (hydrophobic nature) of the substrate, is left in particular regions to form the protrusions. Even if the water containing such element or elements has a very small amount on the order of ppb, the protrusions are formed on the surface of the substrate.

It has been found out that the product defects due to presence of the protrusions containing at least one of C, O, Al, Si, Fe, Cu, Zn, and Zr can be avoided by determining and controlling the content of such element or elements contained in the water used in the washing/drying step and causing the protrusions so that the product defects are avoided. This leads to the completion of this invention.

Furthermore, investigation has been made about how the protrusions are formed. As a result, it has been found out that the size (height) of the protrusions is closely related to the wettability of the surface of the substrate before washing. Specifically, if the surface of the substrate before washing is inferior in wettability (i.e., hydrophobic), water droplets of the cleaning liquid locally stay on the surface of the substrate and are dried. In this event, those elements contained in the water or the atmosphere concentrate to the particular regions to form the protrusions. On the other hand, if the surface of the substrate before washing is superior in wettability (i.e., hydrophilic), the water droplets of the cleaning liquid spread over the surface of the substrate and are dried. In this event, those elements contained in the water or the atmosphere do not concentrate to the particular regions but are dispersed throughout the surface of the substrate. Therefore, no protrusions are formed or, even if the protrusions are formed, the height of the protrusions is too small to cause occurrence of head crash or the thermal asperity.

As an index representative of the surface condition (wettability) of the substrate, use is generally made of a contact angle of water. The contact angle of water is an angle formed between a surface of an object and a water droplet sitting on the surface. It has been found out that the protrusions tend to be produced in case where the contact angle of water on the surface of the substrate before the washing/drying step exceeds 20°.

It has been found out that, in a production process of a substrate for an information recording medium, product defects can be avoided by the use of a correlation between the contact angle of water and the size (height) of the protrusions. Specifically, measurement is made of the contact angle of water on the surface of the substrate before the washing/drying step. Measurement is also made of the size (height) of the protrusions attached to the surface of the substrate after the washing/drying step and containing at least one of C, O, Al, Si, Fe, Cu, Zn, and Zr as a main component. Then, the correlation between the contact angle of water and the size (height) of the protrusions is obtained. Based on the correlation, the contact angle of water on the surface of the substrate before the washing/drying step is controlled so that the protrusions will have such a size (height) that no product defects are caused.

The wettability of the surface of the substrate is related to the surface condition of the surface of the substrate and is generally represented by the contact angle of water. The contact angle of water is typically measured by a method called a sessile drop method.

The surface condition (the wettability or the contact angle of water) of the surface of the substrate depends upon treatment techniques (such as in the washing/drying step) upon production of the substrate, the environment upon production and inspection of the substrate, the environment during storage of the substrate, such as a packaging condition of the substrate and the type of a bag packaging the substrate (the amount of a gas released from the bag, the number of particles produced from the bag, and so on), the storage period of the substrate, the surface roughness of the substrate, the material of the substrate, the surface treatment (for example, hydrophilic treatment) of the substrate, and the like. A combination of those factors determines the wettability of the surface of the substrate. It has been found out that not only the washing/drying step but also those factors must be controlled to control the contact angle of water on the surface of the substrate before the washing/drying step. Based on these findings, this invention has been made.

Thus, it has been found out that the product defects can be avoided by defining the height of the protrusions formed on the surface of the substrate and containing at least one of C, O, Al, Si, Fe, Cu, Zn, and Zr to a predetermined value or less. This leads to the completion of this invention.

This invention includes the following structures.

Structure 1-1

A method of producing a substrate for an information recording medium, the method including a washing/drying step of washing and drying the substrate subjected to precision polishing, the method comprising:

obtaining a correlation between a contact angle of water on a surface of the substrate before the washing/drying step and a size (height) of protrusions attached to the surface of the substrate after the washing/drying step; and controlling (setting) the contact angle of water on the surface of the substrate before the washing/drying step so that the protrusions will have such a size (height) that no hit is caused when at least a recording layer is formed on the substrate to produce the information recording medium and a slider provided with a recording device and/or a reproducing device is made to run on a surface of the information recording medium and/or that no error is caused upon carrying out a recording operation and/or a reproducing operation.

Structure 1-2

A method of producing a substrate for an information recording medium, the method including a washing/drying step of washing and drying the substrate subjected to precision polishing, wherein:

a correlation is established between a contact angle of water on a surface of the substrate before the washing/drying step and a glide test fail rate in a glide test carried out by forming at least a recording layer on the surface of the substrate to produce the information recording medium and by causing a slider provided with a recording device and/or a reproducing device to run on a surface of the information recording medium;

an additional correlation being also established between the contact angle of water on the surface of said substrate before said washing/drying step and an error rate where recording and/or reproducing are carried out for the information recording medium produced by forming at least said recording layer on the surface of said substrate;

the contact angle of water on the surface of said substrate having a value such that the glide test does not result in failure and that a recording error and/or a reproducing error are not caused when the recording and/or the reproducing are carried out for the information recording medium produced by forming at least said recording layer on the surface of said substrate.

Structure 1-3

A method as described in the structure 1-1 or 1-2, wherein the contact angle of water on the surface of the substrate before the washing/drying step is equal to 20° or less.

Structure 1-4

A method of producing a substrate for an information recording medium, the method including the step of packaging the substrate obtained through a washing/drying step, wherein:

the contact angle of water on a surface of the substrate is kept at 20° or less at least immediately before pre-washing and drying the substrate prior to deposition of a film on the substrate after it is unpacked.

Structure 1-5

A method as described in the structure 1-4, wherein:

the contact angle of water on a surface of the substrate at is kept at 20° or less for a period immediately after the washing/drying step and immediately before a pre-washing and drying step performed before a film is deposited on the substrate which is unpacked.

Structure 1-6

A method as described in any one of the structures 1-1 through 1-5, wherein the substrate is a glass substrate.

Structure 1-7

A method as described in any one of the structures 1-1 through 1-6, wherein the substrate is a substrate for a magnetic disk.

Structure 1-8

A method of producing an information recording medium, the method including the steps of preparing a substrate subjected to precision polishing, washing and drying the substrate before depositing a film thereon, and forming at least a recording layer on the substrate after the washing and drying step, the method comprising:

obtaining a correlation between a contact angle of water on a surface of the substrate prior to washing in the washing and drying step and a size (height) of protrusions attached to the surface of the substrate after the washing and drying step; and controlling (setting) the contact angle of water on the surface of the substrate prior to washing in the washing and drying step so that the protrusions will have such a size (height) that no hit is caused when at least a recording layer is formed on the substrate to produce the information recording medium and a slider having a recording device and/or a reproducing device is made to run on a surface of the information recording medium and/or that no error is caused upon carrying out a recording operation and/or a reproducing operation.

Structure 1-9

A method of producing an information recording medium, the method including the steps of preparing a substrate subjected to precision polishing, washing and drying the substrate before depositing a film thereon, and forming at least a recording layer on the substrate after the washing and drying step, wherein:

a correlation is established between a contact angle of water on a surface of the substrate before the washing and drying step and a glide test fail rate in a glide test carried out by forming at least the recording layer on the surface of the substrate to produce the information recording medium and by causing a slider provided with a recording device and/or a reproducing device to run on a surface of the information recording medium;

an additional correlation being also established between the contact angle of water on the surface of said substrate before said washing and drying step and an error rate where recording and/or reproducing are carried out for the information recording medium produced by forming at least said recording layer on the surface of said substrate;

the contact angle of water on the surface of said substrate having a value such that the glide test does not result in failure and that a recording error and/or a reproducing error are not caused when the recording and/or the reproducing are carried out for the information recording medium produced by forming at least said recording layer on the surface of said substrate.

Structure 1-10

A method as described in the structure 1-8 or 1-9, wherein the contact angle of water on the surface of the substrate prior to washing in the washing and drying step is equal to 20° or less.

Structure 1-11

A method as described in any one of the structures 1-8 through 1-10, wherein the washing and drying step uses spin dry.

Structure 1-1 2

A method as described in any one of the structures 1-8 through 1-11, wherein the substrate is a glass substrate.

Structure 1-13

A method as described in any one of the structures 1-8 through 1-11 wherein the substrate is a substrate for a magnetic disk.

According to the structure 1-1, the contact angle of water on the surface of the substrate before the washing/drying step (particularly before drying) as a factor causing protrusions containing at least one of C, O, Al, Si, Fe, Cu, Zn, and Zr is set (determined, preferably, controlled) so that product defects can be avoided. Thus, it is possible to avoid product defects.

Specifically, the contact angle of water on the surface of the substrate before the washing/drying step is set that, when at least the recording layer is formed on the substrate to produce the information recording medium, protrusions will have a size (height) too small to hit the slider provided with the recording and/or the reproducing device and/or that no error is caused upon carrying out the recording operation and/or the reproducing operation. Therefore, it is possible to prevent occurrence of head crash and thermal asperity and to eliminate negative factors causing a defect such as an error in the recording operation and/or the reproducing operation of the information recording medium.

In this invention, the washing/drying step involves a washing operation immediately after precision polishing (final polishing), a washing operation after chemical reinforcement, a washing operation before shipment, a washing operation immediately before deposition, or any other washing operation carried out after the precision polishing and before the deposition. Once the protrusions including at least one of C, O, Al, Si, Fe, Cu, Zn and Zr are formed in any one of the washing/drying steps corresponding to the above-mentioned washing operations, such protrusions may not be removed by the subsequent washing step or steps. Therefore, it is preferable that the contact angle of water on the surface of the substrate before each of these washing/drying steps is determined and controlled so as to avoid product defects.

In the structure 1-1, it is sufficient that the contact angle has a value such that the product defects are avoided. Therefore, the contact angle need not be so small as to require an excessively high cost. In other words, the contact angle can be determined taking the cost into consideration.

The size (height) of the protrusions may be a value obtained by directly measuring only the protrusions containing at least one of C, O, Al, Si, Fe, Cr, Zn, and Zr or may be a value obtained by measuring the surface roughness of the substrate before and after the washing/drying step.

With the structure 1-2, the contact angle of water on the surface of the substrate has a value such that the glide test does not result in failure and that a recording error and/or a reproducing error are not caused. Thus, it is possible to produce the substrate for the information recording medium capable of avoiding the defect and the error mentioned above.

In the structure 1-3, the contact angle of water on the surface of the substrate for the information recording medium before the washing/drying step (particularly before drying) of the substrate is controlled to be equal to 20° or less so that the height of the protrusions formed on the substrate and containing at least one of C, O, Al, Si, Fe, Cu, Zn, and Zr is reduced so as to avoid the product defects when the information recording medium is produced.

As the contact angle of water on the surface of the substrate for the information recording medium before the washing/drying step of the substrate is smaller, the height of the protrusions containing at least one of C, O, Al, Si, Fe, Cu, Zn, and Zr is reduced. Specifically, the contact angle of water on the surface of the substrate before the washing/drying step is preferably equal to 5° or less, more preferably, 10° or less.

With the structure 1-4, in the method of producing the substrate for an information recording medium including the step of packaging the substrate obtained after the washing/drying step, the contact angle of water on the surface of the substrate is kept at 20° or less (preferably, 10° or less) at least immediately before pre-washing and drying the substrate prior to deposition of a film on the substrate after it is unpacked With the structure 1-5, the contact angle of water on the surface of the substrate is kept at 20° or less (preferably, 10° or less) for the period immediately after the washing/drying step and immediately before a pre-washing and drying step performed before the film is deposited on the substrate which is unpacked. Thus, even if spin dry is performed after the substrate is washed by DI water alone, the protrusions containing at least one of C, O, Al, Si, Fe, Cu, Zn, and Zr and having a height causing the product defects are not formed. Therefore, it is possible to shorten the production process and to lower the cost.

For example, the contact angle of water on the surface of the substrate is kept at 20° or less (preferably, 10° or less) during the above-mentioned period by (1) shortening a time period required to wash, inspect, and package the substrate, (2) using, as a case or a bag for packaging the substrate, a packaging material which produces a less amount of a release gas or a less number of particles, and (3) packaging the substrate in the case or the bag with a desiccant contained therein.

The structure 1-6 is defined because this invention is particularly effective in case where the substrate is the glass substrate.

The structure 1-7 is defined because the above-mentioned protrusions cause a serious problem particularly in the substrate for the magnetic disk intended to reduce the flying height of a magnetic head.

The substrate for an information recording medium according to this invention is adapted to the substrate for the magnetic disk subjected to recording/reproducing operations with an extremely small distance kept between a slider and the surface of the magnetic disk.

Furthermore, the above-mentioned protrusions cause a serious problem particularly in the substrate for the magnetic disk to be used with the magnetoresistive head (MR head) intended to prevent the thermal asperity, more particularly in the substrate for the magnetic disk to be used with the giant magnetoresistive head (GMR head). Therefore, the above-mentioned substrate for a magnetic disk is particularly effective for use with the magnetoresistive head or the giant magnetoresistive head.

In the structure 1-8, in the method of producing an information recording medium, the step of washing ad drying the substrate for the information recording medium prior to deposition of the film on the substrate (particularly, the step of pre-washing and drying the substrate immediately before deposition) has the content similar to that of the structure 1-1. This is because the spin dry is carried out in the step of washing and drying the substrate for the information recording medium prior to deposition of the film on the substrate and because, even if the above-mentioned protrusions are not formed on the substrate, product defects can not be avoided in case where the protrusions are formed during the step of washing and drying the substrate prior to deposition.

The structure 1-9 is effective as mentioned in conjunction with the structure 1-2.

With the structure 1-10, the contact angle of water on the surface of the substrate before washing prior to deposition (particularly, pre-washing immediately before deposition) of a film on the substrate is equal to 20° or less. Thus, the height of the protrusions formed on the substrate and containing at least one of C, O, Al, Si, Fe, Cu, Zn, and Zr as a main component is reduced to a level such that the product defects are not caused when the information recording medium is made.

For example, the contact angle of water on the surface of the substrate before washing prior to deposition is controlled to be equal to 20° or less by the method described in conjunction with the structure 1-4 or by treating the substrate in a washing bath (acid, alkali, neutral detergent, and the like) or a hydrophilic treatment bath (silicofluoric acid) prior to deposition.

This invention is particularly effective in the washing/drying step using a drying technique which does not require a chemical solution. For example, such drying method may be the spin dry, air knife (drying by blowing compressed air), and heat drying. The structure 1-11 is defined because the protrusions are produced particularly in the washing/drying step using the spin dry.

Typically, the spin dry performs dehydration alone by high-speed rotation. The spin dry is applicable to both of cassette type (batch type) processing and sheet-feed type processing. In the spin dry, a clean gas such as nitrogen can be made to flow in a desiccator or can be blown to the surface of the substrate. The spin dry includes a method of spraying a pure water shower onto the surface of the substrate to wash or rinse the substrate and to prevent the substrate from being dried, then stopping the pure water shower, and drying the substrate by high speed rotation, a method of directing a jet of high-pressure water (pure water) onto the surface of the substrate being rotated at a high speed to wash the substrate, then stopping the jet of the high-pressure water, and drying the substrate by high speed rotation, and so on.

The washing/drying step using the spin dry includes the spin dry after the washing by the DI water alone, the spin dry after rinsing with the DI water, or the like.

The structure 1-12 is defined because this invention is effective in case where the substrate is the glass substrate excellent in flatness and smoothness.

The structure 1-13 is defined because the above-mentioned protrusions cause a serious problem particularly in the magnetic disk intended to reduce the flying height of the magnetic head.

This invention is particularly effective in case where the magnetic disk is to be mounted in an information recording apparatus using a magnetoresistive head or a giant magnetoresistive head as a recording/reproducing head.

Structure 2-1

A method of producing a substrate for an information recording medium, the method including a washing/drying step of washing and drying the substrate subjected to precision polishing, the method comprising:

preliminarily calculating a correlation between a content of at least one element of C, Al, Si, Fe, Cu, Zn, and Zr contained in water used in the washing/drying step and a size (height) of protrusions attached to the surface of the substrate after the washing/drying step; and determining the content of the element contained in the water used in the washing/drying step so that the protrusions will have such a size (height) that no hit is caused when at least a recording layer is formed on the substrate to produce the information recording medium and a slider provided with a recording device and/or a reproducing device is made to run afloat on a surface of the information recording medium and/or that no error is caused upon carrying out a recording operation and/or a reproducing operation.

Structure 2-2

A method of producing a substrate for an information recording medium, the method including a washing/drying step of washing and drying the substrate subjected to precision polishing, wherein:

the content of at least one element of C, Al, Si, Fe, Cu, Zn, and Zr contained in water used in the washing/drying step is equal to 20 ppb or less.

Structure 2-3

A method as described in the structure 2-1 or 2-2, wherein drying in the washing/drying step is spin dry.

Structure 2-4

A method as described in any one of the structures 2-1 through 2-3, wherein the substrate is a substrate for a magnetic disk.

Structure 2-5

A method as described in the structure 2-4, wherein the substrate is a substrate for a magnetic disk to be used with a magnetoresistive head or a giant magnetoresistive head.

Structure 2-6

A method of producing an information recording medium, the method including the steps of preparing a substrate subjected to precision polishing, pre-washing and drying the substrate before depositing a film thereon, and forming at least a recording layer on the substrate after the pre-washing and drying step, the method comprising:

preliminarily calculating a correlation between a content of at least one element of C, Al, Si, Fe, Cu, Zn, and Zr contained in water used in pre-washing in the pre-washing and drying step and a size (height) of protrusions attached to the surface of the substrate after the pre-washing and drying step; and determining the content of the element contained in the water used in the pre-washing and drying step so that the protrusions will have such a size (height) that no hit is caused when at least a recording layer is formed on the substrate to produce the information recording medium and a slider having a recording device and/or a reproducing device is made to run afloat on a surface of the information recording medium and/or that no error is caused upon carrying out a recording operation and/or a reproducing operation.

Structure 2-7

A method of producing a substrate for an information recording medium, the method including the steps of preparing a substrate subjected to precision polishing, pre-washing and drying the substrate before depositing a film thereon, and forming at least a recording layer on the substrate after the pre-washing and drying step, wherein:

the content of at least one element of C, Al, Si, Fe, Cu, Zn, and Zr contained in water used in the pre-washing and drying step is equal to 20 ppb or less.

Structure 2-8

A method as described in the structure 2-6 or 2-7, wherein drying in the pre-washing and drying step is spin dry.

Structure 2-9

A method as described in any one of the structures 2-6 through 2-8, wherein the substrate is a substrate for a magnetic disk.

Structure 2-10

A method as described in the structure 2-9, wherein the substrate is a substrate for a magnetic disk to be used with a magnetoresistive head or a giant magnetoresistive head.

According to the structure 2-1, the content of at least one element of C, Al, Si, Fe, Cu, Zn, and Zr contained in the water used in the washing/drying step and causing protrusions containing at least one of C, O, Al, Si, Fe, Cu, Zn, and Zr is determined and controlled so that product defects can be avoided. Thus, it is possible to avoid product defects.

Specifically, the content of at least one element of C, Al, Si, Fe, Cu, Zn, and Zr contained in the water used in the washing/drying step is determined and controlled so that, when at least the recording layer is formed on the substrate to produce the information recording medium, protrusions will have a size (height) too small to hit the slider provided with the recording and/or the reproducing device and/or that no error is caused upon carrying out the recording operation and/or the reproducing operation. Therefore, it is possible to prevent occurrence of head crash and thermal asperity and to eliminate negative factors causing a defect such as an error in the recording operation and/or the reproducing operation of the information recording medium. The height of the protrusions is represented by Rp or the like and is preferably equal to 0 nm (i.e., no protrusion is formed). The height of the protrusions may be a value obtained by directly measuring only the protrusions or may be a value obtained by measuring the surface roughness of the substrate before and after the washing/drying step.

In this invention, the washing/drying step involves a washing operation immediately after precision polishing (final polishing), a washing operation after chemical reinforcement, a washing operation before shipment, a washing operation immediately before deposition, or any other washing operation carried out after the precision polishing and before the deposition. Once the protrusions including at least one of C, O, Al, Si, Fe, Cu, Zn and Zr are formed in any one of the washing/drying steps corresponding to the above-mentioned washing operations, such protrusions may not be removed by the subsequent various washing steps. Therefore, it is preferable that the content of at least one element of C, Al, Si, Fe, Cu, Zn, and Zr contained in the water used in each of these washing/drying steps is determined and controlled so as to avoid product defects.

The washing/drying step generally comprises (1) a washing step using acid, alkali, a neutral detergent, and any other appropriate cleaning agent, (2) a rinsing step using pure water or a solvent, and (3) a drying step. However, the washing/drying step may be a simple process comprising dipping into DI water followed by spin dry.

In the structure 2-2, the content of at least one element of C, Al, Si, Fe, Cu, Zn, and Zr contained in the water used in the washing/drying step of the substrate for an information recording medium is equal to 20 ppb or less so that the size (height) of the protrusions formed on the substrate and containing at least one element of C, O, Al, Si, Fe, Cu, Zn, and Zr is reduced so as to avoid the product defects when the information recording medium is produced.

As the content of at least one element of C, Al, Si, Fe, Cu, Zn, and Zr contained in the water used in the washing/drying step of the substrate is smaller, the size (height) of the protrusions containing at least one of C, O, Al, Si, Fe, Cu, Zn, and Zr is reduced (lowered). Specifically, the content is preferably equal to 15 ppb or less, more preferably, 10 ppb or less.

The content of the element or elements contained in the water can be obtained, for example, by the absorptionmetric analysis or the ICP (Inductively Coupled Plasma) atomic emission spectroscopy. The content of the above-mentioned element contained in the water can be appropriately adjusted, for example, by repetition of filtering or ion exchange. The height of the protrusions is represented by Rp or the like and is preferably equal to 0 nm (i.e., no protrusion is formed).

The protrusions are formed particularly when a drying technique without using a chemical solution is performed. For example, the drying technique without using the chemical solution may be the spin dry, air knife (drying by blowing compressed air), and heat drying, The structure 2-3 is defined because the protrusions are formed particularly in the washing/drying step using the spin dry.

The structure 2-4 is defined because the above-mentioned protrusions cause a serious problem particularly in the substrate for the magnetic disk intended to reduce the flying height of a magnetic head.

The substrate for an information recording medium according to this invention is adapted to the substrate for the magnetic disk subjected to recording/reproducing operations with an extremely small distance kept between a slider and the surface of the magnetic disk.

The structure 2-5 is defined because the above-mentioned protrusions cause a serious problem particularly in the substrate for the magnetic disk to be used with the magnetoresistive head (MR head) intended to prevent the thermal asperity, more particularly in the substrate for the magnetic disk to be used with the giant magnetoresistive head (GMR head).

The structure 2-6 defines the method of producing an information recording medium, in which the content similar to that of the structure 2-1 is applied to the step of washing and drying the substrate for the information recording medium prior to deposition of the film on the substrate (particularly, the step of pre-washing and drying the substrate immediately before deposition). This is because the spin dry is often carried out in the step of washing and drying the substrate for the information recording medium prior to deposition of the film on the substrate and because, even if the above-mentioned protrusions are not formed on the substrate, product defects can not be avoided in case where the protrusions are formed during the step of washing and drying the substrate prior to deposition.

With the structure 2-7, the content of at least one element of C, Al, Si, Fe, Cu, Zn, and Zr contained in the water used in the step of washing (particularly, pre-washing immediately before deposition) and drying the substrate prior to deposition of a film on the substrate is controlled to be equal to 20 ppb or less. Thus, the size (height) of the protrusions formed on the substrate and containing at least one of C, O, Al, Si, Fe, Cu, Zn, and Zr is reduced to a level such that the product defects are not caused when the information recording medium is made.

As the content of the above-mentioned element contained in the water used in the pre-washing and drying step is smaller, the size (height) of the protrusions containing at least one of C, O, Al, Si, Fe, CU, Zn, and Zr is reduced (lowered). Specifically, the content is preferably equal to 15 ppb or less, more preferably, 10 ppb or less. The height of the protrusions is represented by Rp or the like and is preferably equal to 0 nm (i.e., no protrusion is formed).

The protrusions are formed particularly when a drying technique without using a chemical solution is performed. For example, the drying technique without using the chemical solution may be the spin dry, air knife (drying by blowing compressed air), and heat drying. The structure 2-8 is defined because the protrusions are formed particularly in the washing/drying step using the spin dry.

Typically, the spin dry performs dehydration alone by high-speed rotation. The spin dry is applicable to both of cassette type (batch type) processing and sheet-feed type processing. In the spin dry, a clean gas such as a nitrogen gas can be made to flow in a desiccator or can be blown to the surface of the substrate. The spin dry includes a method of spraying a pure water shower onto the surface of the substrate to wash or rinse the substrate and to prevent the substrate from being dried, then stopping the pure water shower, and drying the substrate by high speed rotation, a method of directing a jet of high-pressure water (pure water) onto the surface of the substrate being rotated at a high speed to wash the substrate, then stopping the jet of the high-pressure water, and drying the substrate by high speed rotation, and so on.

The washing/drying step using the spin dry includes the spin dry after the washing by the DI water alone, the spin dry after rinsing with the DI water, or the like.

The structure 2-9 is defined because the above-mentioned protrusions cause a serious problem particularly in the magnetic disk intended to reduce the flying height of the magnetic head.

With the structure 2-9, the magnetic disk capable of carrying out high-density recording/reproducing operations can be obtained.

The structure 2-10 is defined because the above-mentioned protrusions cause a serious problem particularly in the substrate for the magnetic disk to be used with the magnetoresistive head (MR head) intended to prevent the thermal asperity, more particularly in the substrate for the magnetic disk to be used with the giant magnetoresistive head (GMR head).

With the structure 2-10, the magnetic disk capable of carrying out higher-density recording/reproducing operations can be obtained.

The height of the protrusions containing at least one of C, O, Al, Si, Fe, Cu, Zn, and Zr depends upon the surface condition (wettability) of the surface of the substrate. If the wettability of the surface of the substrate is improved (i.e., the contact angle of water becomes small), water droplets of the cleaning water spread over the surface of the substrate and are dried. In this event, C, O, Al, Si, Fe, Cu, Zn, and/or Zr forming the protrusions do not concentrate to particular regions but are dispersed throughout the surface of the substrate.

As described above, if the content of at least one element of C, Al, Si, Fe, Cu, Zn, and Zr contained in the water used in the washing/drying step is equal to 20 ppb or less, the protrusions containing at least one of C, O, Al, Si, Fe, Cu, Zn, and Zr and having the size (height) causing the product defects are not formed in general. Furthermore, it the content of at least one element of C, Al, Si, Fe, Cu, Zn, and Zr contained in the water is controlled to 20 ppb or less and simultaneously if the wettability of the surface of the substrate is improved, the protrusions are more hardly produced.

The contact angle of water on the surface of the substrate is preferably equal to 20° or less, more preferably, equal to 10° or less. The contact angle of water is measured by the sessile drop method.

The contact angle of water (wettability) depends upon the amount of organic substances attached to the surface of the substrate, the surface roughness of the substrate, the material of the substrate, and the like. Among others, the amount of the organic substances attached to the surface of the substrate greatly affects the contact angle. Therefore, it is desirable to store the substrates under an environment capable of keeping the contact angle at a small value, i.e., an environment in which a less amount of the organic substances are produced from a substrate case or a bag and attached to the surface of the substrate.

Structure 3-1

A substrate for an information recording medium, wherein protrusions attached and formed on a surface of the substrate and containing at least one of C, O, Al, Si, Fe, Cu, Zn, and Zr have a height (Rp) such that no hit is caused when at least a recording layer is formed on the substrate to produce the information recording medium and a slider provided with a recording device and/or a reproducing device is made to run afloat on a surface of the information recording medium and/or that no error is caused upon carrying out a recording operation and/or a reproducing operation.

Structure 3-2

A substrate as described in the structure 3-1, wherein the height (Rp) of the protrusions is such that no hit is caused when the slider is made to run afloat with respect to the surface of the information recording medium at a flying height of 30 nm or less and/or that no error is caused upon carrying out a recording operation and/or a reproducing operation.

Structure 3-3

A substrate as described in the structure 3-1 or 3-2, wherein the height of the protrusions attached and formed on the surface of the substrate falls between 0 and 30 nm in terms of Rp.

Structure 3-4

A substrate as described in any one of the structures 3-1 through 3-3, wherein the protrusions have a ratio Rp/Rv which is not smaller than 10.

Structure 3-5

A substrate as described in any one of the structures 3-1 through 3-4, wherein an interface indicative of attachment of foreign matters is present between the protrusions and the surface of the substrate.

Structure 3-

A substrate as described in any one of the structures 3-1 through 3-5, wherein the protrusions are formed by an impurity element contained in water used in a washing/drying step of washing and drying the substrate.

Structure 3-7

A substrate as described in the structure 3-6, wherein a contact angle of water on the surface of the substrate before the washing/drying step is equal to 20° or less.

Structure 3-8

A substrate as described in any one of the structures 3-1 through 3-7, wherein the substrate is a substrate for a magnetic disk.

Structure 3-9

An information recording medium comprising a substrate described in any one of the structures 3-1 through 3-8 and at least a recording layer formed thereon.

Structure 3-10

An information recording medium as described in the structure 3-9, wherein the recording layer is a magnetic layer.

Structure 3-11

An information recording medium as described in the structure 3-10, wherein the information recording medium is a magnetic disk for use with a magnetoresistive head or a giant magnetoresistive head.

According to the structure 3-1, the protrusion attached and formed on the surface of the substrate and containing at least one of C, O, Al, Si, Fe, Cu, Zn, and Zr has a height (Rp) such that the product defects can be avoided. Thus, the product defects can be avoided.

Specifically, the protrusion attached and formed on the surface of the substrate and containing at least one of C, O, Al, Si, Fe, Cu, Zn, and Zr has a height (Rp) such that no hit is caused when at least a recording layer is formed on the substrate to produce the information recording medium and a slider provided with a recording device and/or a reproducing device is made to run afloat on a surface of the information recording medium and/or that no error is caused upon carrying out a recording operation and/or a reproducing operation. Thus, it is possible to prevent occurrence of head crash and thermal asperity and to eliminate negative factors causing a defeat such as an error in the recording operation and/or the reproducing operation of the information recording medium. Herein, the height of the protrusions may be a value obtained by directly measuring only the protrusions or may be a value obtained by measuring the surface roughness of the substrate before and after the washing/drying step.

As described in the structure 3-2, the slider has a flying height which is preferably equal to 30 nm or less, more preferably 20 nm or less, in order to enable recording and reproducing operations at a high density. Depending upon a recording/reproducing system, the slider may be brought into pseudo contact with the surface of the recording medium or the slider may run in contact therewith. In such events, the flying height of the slider may be equal to 0 nm. Therefore, this invention includes the case where the flying height of the slider is equal to 0 nm.

In the structure 3-3, the height of the protrusions attached and formed on the surface of the substrate is controlled to fall between 0 and 30 nm in terms of Rp. With this structure, it is possible to avoid the hit of the slider when the slider has a flying height of 30 nm. Furthermore, in case where the slider has a flying height smaller than 30 nm and 20 nm, the height of the protrusions are controlled to fall between 0 and 20 nm and between 0 and 10 nm in terms of Rp, respectively. Thus, it is possible to obtain the information recording medium capable of carrying out the recording and the reproducing operations at a high density without causing a hit of the slider and a recording or a reproducing error.

Herein, Rp represents a distance from a mean line to a highest peak. Rp can be measured by the atomic force microscope or a probe-type surface roughness meter such as Talystep (Taylor-Hobson). In this invention, it is necessary to obtain accurate and strict information about the surface condition of the substrate (medium) in order to achieve high-density recording and reproducing operations. Therefore, the value measured by the atomic force microscope is used as Rp.

It is noted here that the value of Rp never exceeds the maximum roughness Rmax. Rmax has a correlation with the flying height of the slider afloat on the surface of the medium. Unless Rmax is sufficiently smaller than the flying height of the slider, the head inevitably collides with the protrusions. In case of a hard disk of the CSS (Contact Start Stop) system in which the flying height of the slider is 30 nm or less, it is practically desired that Rmax is equal to about 10 nm. In case of a hard disk of the CSS system in which the flying height of the slider is 20 nm or less, Rmax is required to have a further small value. In case where the recording or the reproducing operation is carried out while the slider is kept In contact with the surface of the medium, it is necessary to keep the surface condition such that the slider is not attracted and attached to the surface of the medium.

In the structure 3-4, Rv represents the height from the center line to the bottom. Rv is produced by polishing and has a value between 2 and 3 nm irrespective of presence or absence of the protrusions. If the surface roughness is small, Rv has a smaller value. The surface of the substrate obtained by typical grinding and polishing has a ratio Rp/Rv smaller than 10. On the other hand, the protrusions causing the product defects are indicated by the ratio Rp/Rv not smaller than 10 and are produced due to the presence of impurity elements contained in the cleaning water. In the substrate for the magnetic disk to be used with the slider having a flying height of 30 nm or less, the protrusions causing the product defects have a height not smaller than 20 to 30 nm. Therefore, if the ratio Rp/Rv of the surface of the substrate is great, this means that the protrusions causing the product defects are formed. If the ratio Rp/Rv of the surface of the substrate is smaller than 10, the protrusions are very low in height and do not cause the product defects even if the protrusions are formed.

As described in the structure 3-5, the protrusions can be judged as the foreign matters attached to the substrate in case where the interface is present between the protrusions and the surface of the substrate.

Thus, since the protrusions are substances attached to the substrate, the protrusions are similarly produced in any substrate other than the glass substrate.

As described in the structure 3-6, the protrusions are formed by the impurity elements (C, O, Al, Si, Fe, Cu, Zn, or Zr) contained in the water used in the washing/drying step. From the experimental results which will later be described, it has been confirmed that the protrusions depend upon the surface condition (wettability) of the surface of the substrate. If the wettability of the surface of the substrate is improved (i.e., the contact angle of water becomes small), water droplets of the cleaning water containing the impurity elements spread over the surface of the substrate and are dried. In this event, the impurity elements forming the protrusions do not concentrate to particular regions but are dispersed throughout the surface of the substrate so that the protrusions are not formed or, even formed, are extremely small in size. On the contrary, if the contact angle of water on the surface of the substrate is increased, each water droplet of the cleaning water containing the impurity elements concentrates to a single spot and is then dried. Therefore, the above-mentioned problems are caused and the protrusions are formed.

The protrusions are formed particularly when a drying technique without using a chemical solution is performed. For example, the drying technique without using the chemical solution may be the spin dry, air knife (drying by blowing compressed air), and heat drying. In these drying techniques, a small amount of the DI water is left on the surface as a thin film so that the protrusions are readily formed, unlike the washing/drying technique using IPA.

Accordingly, as described in the structure 3-7, it is preferable that the contact angle of water on the surface of the substrate is reduced in case where the substrate is washed and dried as described in the structure 3-6. Specifically, the contact angle is preferably equal to 20° or less, more preferably, 10° or less. The contact angle of water is measured by the sessile drop method.

The structure 3-8 is defined because the above-mentioned protrusions cause a serious problem particularly in the substrate for the magnetic disk intended to reduce the flying height of a magnetic head.

The substrate for an information recording medium according to this invention is adapted to the substrate for the magnetic disk subjected to recording/reproducing operations with an extremely small distance kept between the slider and the surface of the magnetic disk.

As described in the structure 3-9, the magnetic disk capable of carrying out high-density recording and reproducing operations can be obtained by forming the magnetic layer on the substrate described in any one of the structures 3-1 and 3-8.

As described in the structure 3-10, the information recording medium suppressed in occurrence of defects can be obtained by forming a recording layer on the substrate described in any one of the structures 3-1 through 3-8.

The structure 3-11 is defined because the above-mentioned protrusions cause a serious problem particularly in the magnetic disk to be used with the magnetoresistive head (MR head), more particularly in the magnetic disk to be used with the giant magnetoresistive head (GMR head).

With the structure 3-11, the magnetic disk capable of carrying out higher-density recording/reproducing operations can be obtained.

DESCRIPTION OF THE PREFERRED EMBODIMENTS

EXAMPLE 1-1

Figure 1:
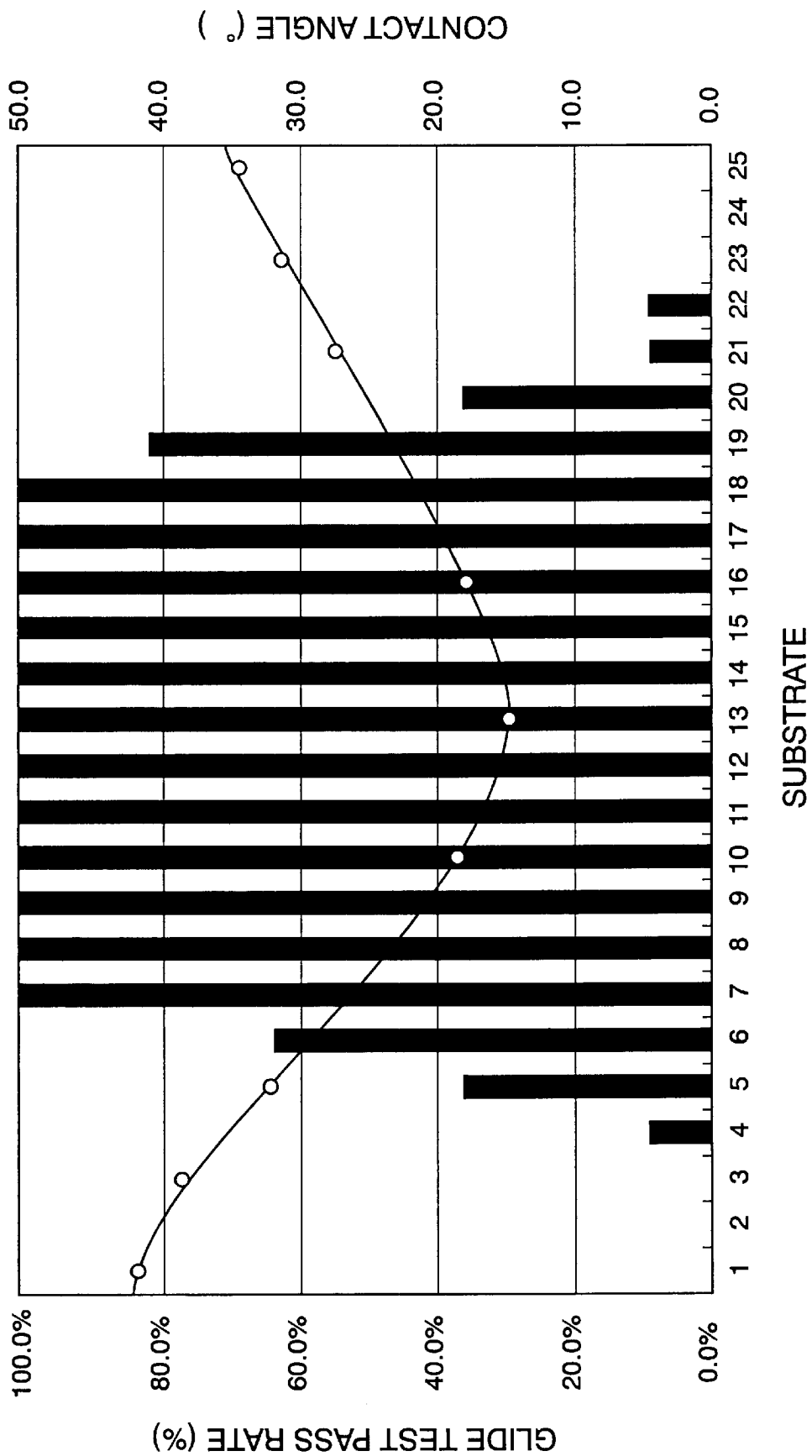
FIG. 1 shows the relationship between the contact angle of water and glide test pass rate.

In Example 1-1, investigation has been made about the relationship between a contact angle and a protrusion height and the relationship between the contact angle and a glide defect (namely, a glide test fail or a glide fail).

Several thousands of disk-shaped glass substrates were prepared. A pair of principal surfaces of each glass substrate were subjected to precision-polishing to obtain the surface roughness represented by 5.3 nm<Rmax<9.3 nm, 0.6 nm<Ra<1.0 nm, and 2.8 nm<Rp<5.5 nm. Each of these glass substrates was dipped successively into washing baths of a neutral detergent, DI water, IPA (isopropylatcohol) with an ultrasonic wave applied to the washing baths. Thereafter, the glass substrates were dried in IPA (steam dry tank) and put in disk cases (manufactured by EMPAK, Inc.) each of which contains 25 substrates. These disk cases were packaged in a bag made of polyethylene (PE) commercially available. The interior of the bag was forcedly evacuated. The bag was sealed by hot sealing and thereafter held in a clean room environment for several days. Each of the disk cases comprises an outer container made of polypropylene (PP) and an inner substrate holder made of polyethylene (PE) and releases a less amount of an organic gas or a less number of particles.

Next, the substrates were taken out from the disk cases and measurement was made of the contact angle of water on the surface of each substrate. Thereafter, each substrate was dipped into the DI water and dried by the spin dry to obtain a glass substrate for a magnetic disk. The contact angle of water was measured by a sessile drop method (in the following description, the contact angle was measured in the same method).

The surface of the glass substrate for the magnetic disk obtained as mentioned above was observed by a microscope and an electron microscope. As a result, it has been confirmed that semispherical protrusions having a size between about 1 $\mu$m and several $\mu$m were formed on some glass substrates.

Investigation was made about the relationship between the contact angle of water on the surface of the substrate and the surface roughness (height of protrusions) of the substrate. As a result, it has been confirmed that the surface roughness (height of protrusions) of the substrate become greater as the contact angle of water before dipping into the DI water and the spin dry was increased, as will be understood from Table 1-1.

TABLE 1-1

| Contact Angle | 5° | 10° | 15° | 20° | 30° |
|---|---|---|---|---|---|
| Surface Roughness of Substrate (Height of Protrusions) (Rp) | 2.8– 3.9 nm | 4.5– 5.5 nm | 5.8– 10.2 nm | 7.3– 19.6 nm | 15.1– 31.3 nm |

The protrusions were analyzed by EDS (Energy Dispersive X-ray Spectroscopy) to confirm that the protrusions mainly contained Si and O.

The protrusions were analyzed by TOF-SIMS (Time of Flight Secondary Ion Mass Spectrometry) to confirm that the protrusions contained SiOH as a main component.

On each of opposite surfaces of the glass substrate after the spin dry, an NiAl seed layer, a CrV underlying layer, a CoCrPtB magnetic layer, a carbon protection layer, and a perfluoropolyether lubricant layer were formed to obtain a magnetic disk for use with a MR head.

Each of the magnetic disks obtained as mentioned above was subjected to a glide test. In the glide test, a minimum flying height of the magnetic head was varied from 18 nm to 10 nm assuming the case where the recording/reproducing operations were carried out with the MR head kept at the flying height of 20 nm. The result is shown in FIG. 1. In FIG. 1, a left ordinate represents a glide test pass rate and a right ordinate represents the contact angle of water on the surface of the substrate before dipping into the DI water and the spin dry. An abscissa represents the substrates having the contact angles represented by the right ordinate. In FIG. 1, the glide test pass rate is given by a bar and the contact angle is given by a symbol "○".

As is obvious from FIG. 1, when the contact angle of water on the surface of the substrate is great and exceeds 20°, the glide test pass rate is low (that is, a glide test fail rate is high). The glide test is to detect, throughout an entire circumference of the substrate, the protrusions having a predetermined height or more by the use of a head running at the predetermined flying height. The fact that the glide test pass rate is low represents that the probability of production of the protrusions is high. A glide test fail or a glide fail is equivalent in meaning to a glide defect.

Thus, the relationship between the contact angle of water on the surface of the substrate before the washing/drying step and the height of the protrusions (surface roughness of the substrate) attached to the surface of the substrate obtained through the washing/drying step is preliminarily grasped or detected. Furthermore, the contact angle of water on the surface of the substrate is suppressed to a predetermined value or less (for example, 20° or less) so that the height of the protrusions (surface roughness) is not greater than an allowable height of the protrusions causing no hit or no recording/reproducing error when the slider is made to run afloat. In this manner, it is possible to reliably prevent the glide defect or the degradation in recording/reproducing function due to the thermal asperity when the magnetic disk is formed by the use of the substrate. In an actual production process of the glass substrate or the magnetic disk, the correlation between the contact angle of water on the surface of the substrate before the washing/drying step and each of the glide yield and the error rate upon the recording or the reproducing operation is sometimes known in advance. In this event, by simply setting the contact angle to a value such that no glide defect and/or no recording/reproducing error is caused, the glide defect or the degradation in recording/reproducing function due to the thermal asperity can be avoided.

Examples 1-2 through 1-6 given below provide methods (means) for suppressing the increase in contact angle of water (specifically, suppressing the contact angle of water to 20° or less) in order to prevent the glide defect or the occurrence of thermal asperity in the method of producing the substrate for an information recording medium comprising the step of packaging the substrate obtained through the washing/drying step. In each Example, a factor related to the contact angle of water is mentioned as well as means for dealing with such factor to suppress the increase in contact angle and the effect achieved thereby.

EXAMPLE 1-2

In Example 1-1, it has been found out that the contact angle of water on the surface of the substrate before dipping into the DI water and the spin dry is related to the production of the protrusions. In Example 1-2, the relationship between the type of the bag (the release of the gas) and the contact angle of water on the surface of the substrate was examined.

Figure 2:
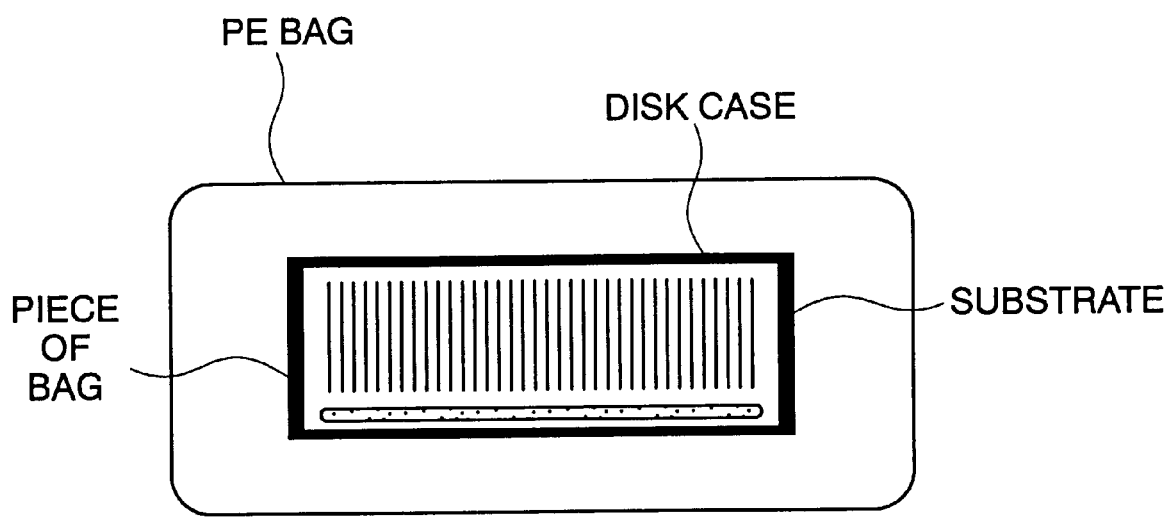
FIG. 2 is a front view for describing a test for investigating the relationship between a package material and the contact angle of water on the surface of the substrate.

Referring to FIG. 2, description will be made of a test for investigating the relationship between the material of the bag and the contact angle of water. Preparation was made of PE bags and PE/Al/PE laminate bags each of which has a thickness of 0.08 mm. As illustrated in FIG. 2, a piece of each of the PE and the PE/Al/PE bags, having a predetermined size, was put in the disk case containing 25 substrates and was spread at the bottom. The disk cases were put in a PE bag. The bag was forcedly evacuated, seated by hot sealing, and held in an environment of 50° C. and 90% RH (Relative Humidity) for 24 hours.

Measurement was made of the contact angle of water on the surface of each substrate held in the above-mentioned environment. As a result, the substrates held together with the PE bag had an average contact angle of water of 50.4° which is high as compared with those substrates held with the PE/Al/PE laminate bag. The contact angle on the substrate was measured for each of different parts of the substrate, i.e., an upper part, a bottom part, intermediate parts (left and right) upon storage in the case. As a result, the contact angle was highest at the bottom part of the substrate which is nearest to the piece of the bag. It is believed that the gas released from the bag is contacted and attached to the surface of the substrate to increase the contact angle.

Therefore, by the use of the bag which does not release the gas increasing the contact angle of water, it is possible to suppress the contact angle of water of the substrate stored in the disk case. Actually, the magnetic disk was prepared in the manner similar to Example 1-1 by the use of the bag releasing a less amount of the gas. After measuring the contact angle, the glide test was performed. As a result, the contact angle of water was smaller than 10° in all substrates and no glide defect was caused.

EXAMPLE 1-3

In Example 1-3, investigation was made of the relationship between the amount of particles contained in the bag and the contact angle of water of the substrate.

Preparation of made of three kinds of bags. A predetermined amount of pure water was poured into each bag so as to contact with a preselected area of the bag. Thus, the particles were extracted. By the use of an LPC (Liquid Particle Counter), the amount of particles contained in each bag and greater in diameter than 0.5 $\mu$m was measured.

Measurement was made of the contact angle of water for the substrates contained in each bag. As a result, the substrates packaged in the bag containing a greatest amount of particles (2387.5 count/cm$^3$) had the contact angle of water of 32.6°. On the other hand, the contact angles were 6.5° and 5.2° for those substrates packaged in the relatively clean bags containing particle amounts of 569.6 count/cm$^3$ and 20.8 count/cm$^3$, respectively. Thus, for the substrates packaged in the former bag, the contact angle was high as compared with those in the latter bags and the glide defect was caused. It is understood that, if organic particles which are hydrophobic are attached to the substrate, the contact angle will be increased. On the other hand, preparation was made of magnetic disks in the manner similar to Example 1-1 by the use of substrates packaged in two other types of relatively clean bags. These substrates were subjected to the glide test. As a result, no glide defect was caused.

From the above-mentioned result, the amount of particles present in the bag is desired to be small. Specifically, those particles exceeding 0.5 $\mu$m are contained preferably in an amount of 1000 count/cm$^3$ or less, more preferably, 500 count/cm$^3$ or less, further preferably, 250 count/cm$^3$ or less.

EXAMPLE 1-4

In Example 1-4, investigation was made about the relationship between the temperature and the humidity (moisture transmittance) in the bag and the contact angle of water on the surface of the substrate.

The substrates in the disk cases were packaged and sealed in the PE bags with and without the desiccant contained therein. After a holding period of three months, the contact angle of water on the surface of the substrate was measured. As a result, the contact angle was as low as 10° or less on the surface of each substrate held in the bag with the desiccant On the other hand, for those substrates held in the bag without the desiccant for three months, weathering or a stain was locally formed on the glass surface and the contact angle of water on the surface of the substrate exceeds 20° to reach about 45°. This is presumably because water molecules attached to the glass surface repeatedly adsorb the particles and evaporate. The glide test was carried out in the manner similar to Example 1-1. As a result, the protrusions described in conjunction with Example 1-1 were high and the glide defect was caused in the magnetic disks comprising the substrates having such a large contact angle. On the other hand, magnetic disks were prepared in the manner similar to Example 1-1 by the use of substrates held in an environment with a desiccant contained therein to adjust the humidity. These magnetic disks were subjected to the glide test. As a result, no glide defect was caused.

Therefore, by putting the desiccant in the bag, it is possible to suppress the increase in contact angle of the substrate during long-term storage such as three months and to prevent the glide defect due to the protrusions.

EXAMPLE 1-5

In Example 1-5, investigation was made of the relationship between a holding time of holding the substrate in the clean room after washing the substrate and the contact angle of water on the surface of the substrate.

In the production process of the substrate, the substrate after precision polishing is subjected to final washing (preshipment washing) directly after the precision polishing or via another step. Then, the substrate was subjected to a testing step, stored in a shipping container such as a disk case, and put in the bag to be shipped. In the abovementioned process, the substrate is held in the clean room for a relatively long holding time after washing the substrate and before packaging the substrate following the testing step. The influence of the holding time was examined in Example 1-5.

Preparation was made of 200 substrates after the final washing (preshipment washing). The 100 substrates were put in a washing basket and held in the clean room. The remaining 100 substrates were put in the disk cases each of which contained 25 substrates. The disk cases were respectively packaged in the PE bags which were sealed and held. For those substrates which were not put in the bag, the contact angle was increased with the lapse of the holding time starting from the time instant immediately after the washing step. In particular, the contact angle of water on the surface of the substrate exceeded 20° when the holding time exceeds about 70 hours. On the other hand, for those substrates put and sealed in the bag immediately after the washing/drying step, no substantial increase in contact angle was observed even after the lapse of the holding time. Therefore, it will be understood that, by shortening the holding time of the substrate after completion of a series of production steps (after the washing/drying step) and before packaging following the testing step, the increase in contact angle of the substrate can be suppressed. In the manner similar to Example 1-1, magnetic disks were prepared by the use of substrates which were put and sealed in a bag immediately after washed and dried and substrates which were held for the holding time of 60 hours. These substrates were subjected to the glide test. As a result, no glide defect was caused.

The time from the completion of the washing/drying step to the packaging of the substrate following the testing step is preferably not longer than 70 hours, more preferably not longer than 30 hours, further preferably not longer than 10 hours.

EXAMPLE 1-6

In Example 1-6, each of the substrates put in the washing basket and left in the clean room in Example 1-5 was successively dipped in the washing bath (acid, alkali, neutral detergent, or the like) or the hydrophilic treating bath (silicofluoric acid or the like), the pure water bath, and the DI water bath, and then dehydrated by the spin dry. As a result, the protrusions of the height causing the product defects were not formed.

In this case, the contact angle of water on the surface of the substrate before pre-washing is great. However, the contact angle of water on the surface of the substrate before the spin dry is lowered by the treatment in the washing bath or the hydrophilic treating bath. Therefore, no protrusion is formed. However, the above-mentioned dipping step increases the number of steps and the cost.

EXAMPLE 2-1

A plurality of disk-shaped glass substrates were prepared. A pair of principal surfaces of each glass substrate were subjected to precision-polishing to obtain the surface roughness represented by 5.3 nm<Rmax<9.3 nm, 0.6 nm<Ra<1.0 nm, and 2.8 nm<Rp<5.5 nm. Each of these glass substrates was dipped successively into washing baths of a neutral detergent and pure water with an ultrasonic wave applied to the washing baths. On the other hand, DI water was prepared by multiple repetition of ion exchange so that the content of Si is adjusted to 5 ppb, 10 ppb, 20 ppb, and 30 ppb. Thereafter, each glass substrate was dipped into the DI water and dried by the spin dry. Thus, glass substrates for magnetic disks were obtained as substrates after the spin dry. The content of Si in the DI water was measured by the absorptionmetric analysis (in the following description, the content of Si was measured in the same method).

The surface of the glass substrate for the magnetic disk obtained as mentioned above was observed by a microscope and an electron microscope. As a result, it has been confirmed that semispherical protrusions having a size between about 1 μm and several μm were formed on some glass substrates.

The protrusions were analyzed by EDS (Energy Dispersive X-ray Spectroscopy) to confirm that the protrusions mainly contained Si and O. The protrusions were analyzed by TOF-SIMS (Time of Flight Secondary Ion Mass Spectrometry) to confirm that the protrusions contained SiOH as a main component.

Furthermore, the surface roughness (height of protrusions) of the substrate after the above-mentioned spin dry was measured by an atomic force microscope (AFM). The result is shown in Table 2-1.

Prior to deposition of a thin film such as a magnetic layer on each substrate after the spin dry, pre-washing was carried out by successively dipping the substrate into washing baths of a neutral detergent, DI water (the content of Si being 20 ppb), and IPA (isopropylalcohol) with an ultrasonic wave applied to the washing baths. Thereafter, the glass substrate was dried in IPA (steam dry tank). Thus, a plurality of glass substrates for magnetic disks were obtained as substrates after the IPA dry.

The surface roughness (height of protrusions) of the substrate after the IPA dry was measured by the atomic force microscope (AFM). The result is shown in Table 2-1.

TABLE 2-1

| Content of Si | | 5 ppb | 10 ppb | 20 ppb | 30 ppb |
|---|---|---|---|---|---|
| Surface Roughness (Rp) | After Spin Dry | 2.7–5.6 nm | 2.8–5.8 nm | 5.8–9.2 nm | 9.3–23.1 nm |
| | After IPA Dry | 2.9–5.7 nm | 3.0–5.9 nm | 6.0–9.5 nm | 10.5–24.2 nm |

As is obvious from Table 2-1, the surface toughness (height of protrusions) (Rp) of the substrate after the spin dry is greater with the increase in content of Si in the DI water in which the substrate was dipped before the spin dry. When the content of Si in the DI water is not greater than 20 ppb, the surface roughness (height of protrusions) (Rp) of the substrate is smaller than 10 nm. When the content of Si exceeds 20 ppb, the surface roughness (height of protrusions) (Rp) of the substrate is dramatically increased.

Since the IPA dry is used in the pre-washing step, the surface roughness (height of protrusions) (Rp) of the substrate is not increased. Specifically, even if the content of Si in the DI water used in the pre-washing step is equal to 20 ppb, the surface roughness (height of protrusions) (Rp) of the substrate is not increased in case of the IPA dry.

When the content of Si was equal to 5 ppb and 10 ppb, no protrusion was observed on the surface of the substrate. When the content of Si was equal to 20 ppb, the protrusions were formed but had a maximum height of 4 nm which did not cause any problem.

Next, on each of opposite surfaces of the glass substrate after the pre-washing, an NiAl seed layer, a CrV underlying layer, a CoCrPtB magnetic layer, a carbon protection layer, and a perfluoropolyether lubricant layer were formed to obtain a magnetic disk for use with an MR head.

Each of the magnetic disks obtained as mentioned above was subjected to a glide test. In the glide test, a minimum flying height of the magnetic head was varied from 18 nm to 10 nm assuming the case where the recording/reproducing operations would be carried out with the MR head kept at the flying height of 20 nm. As a result, glide defects were caused in a part of the glass substrates which were washed by the DI water with the content of Si being 30 ppb and then dried by the spin dry. The remaining glass substrates, which were washed by the DI water with the content of Si being 30 ppb and then dried by the spin dry, passed the glide test but later suffered malfunction in the reproducing operation due to the thermal asperity. On the other hand, for those glass substrates washed by the DI water with the content of Si being 20 ppb or less and dried by the spin dry, neither glide defects nor malfunction in the reproducing operation due to the thermal asperity was caused.

EXAMPLE 2-2

A plurality of disk-shaped glass substrates were prepared. A pair of principal surfaces of each glass substrate were subjected to precision-polishing to obtain the surface roughness represented by 5.3 nm<Rmax<9.3 nm, 0.6 nm<Ra<1.0 nm, and 2.8 nm<Rp<5.5 nm. Each of these glass substrates was dipped successively into washing baths of a neutral detergent, DI water, DI water (content of Si being 30 ppb), and IPA (isopropylalcohol) with an ultrasonic wave applied to the washing baths. Thereafter, each glass substrate was dried by IPA (steam dry tank). Thus, a plurality of glass substrates for magnetic disks were obtained as substrates after the IPA dry.

The surface roughness (height of protrusions) of the substrate obtained as mentioned above was measured by the atomic force microscope. The result of measurement is shown in Table 2-2. Furthermore, evaluation was made of the wettability of the substrate obtained as mentioned above to reveal that the contact angle of water was 6 to 10°. The contact angle of water was measured by the sessile drop method (in the following description, the contact angle was measured in the same method).

Prior to deposition of a thin film such as a magnetic layer on each glass substrate, the glass substrate after the IPA steam dry was dipped into the DI water (the content of Si being 5 ppb, 10 ppb, 20 ppb, 30 ppb) and dried by the spin dry. Thus, a plurality of glass substrates for magnetic disks after the spin dry were obtained.

The surface roughness (height of protrusions) of the substrate after the spin dry was measured by the atomic force microscope. The result of measurement is shown in Table 2-2.

TABLE 2-2

| Content of Si | | 5 ppb | 10 ppb | 20 ppb | 30 ppb |
|---|---|---|---|---|---|
| Surface Roughness (Rp) | After IPA Dry | 2.8–6.2 nm | 2.7–6.3 nm | 2.5–6.2 nm | 2.7–6.1 nm |
| | After Spin Dry | 2.7–6.1 nm | 2.9–6.5 nm | 6.1–8.9 nm | 10.3–32.0 nm |

As is obvious from Table 2-2, the surface roughness (height of protrusions) (Rp) of the substrate is small since the washing after precision polishing uses the IPA dry. Even if the DI water used in this washing step contains Si at the content of 30 ppb, the surface roughness (height of protrusions) (Rp) of the substrate is suppressed or small by the use of the IPA dry.

The surface roughness (height of protrusions) (Rp) of the substrate after the spin dry in the pre-washing step is greater with the increase in content of Si in the DI water in which the substrate is dipped before the spin dry. When the content of Si in the DI water is not greater than 20 ppb, the surface roughness (height of protrusions) (Rp) of the substrate is smaller than 10 nm. When the content of Si exceeds 20 ppb, the surface roughness (height of protrusions) (Rp) of the substrate is dramatically increased.

When the content of Si was equal to 5 ppb and 10 ppb, no protrusion was observed on the surface of the substrate. When the content of Si was equal to 20 ppb, the protrusions were formed but had a maximum height of 3 nm which did not cause any problem.

The protrusions were observed by EDS and TOF-SIMS. As a result, it has been confirmed that the protrusions were similar to those in Example 2-1.

Next, on each of opposite surfaces of the glass substrate after the pre-washing, an NiAl seed layer, a CrV underlying layer, a CoCrPtB magnetic layer, a carbon protection layer, and a perfluoropolyether lubricant layer were formed to obtain a magnetic disk for use with a MR head.

Each of the magnetic disks obtained as mentioned above was subjected to a glide test. In the glide test, a minimum flying height of the magnetic head was varied from 18 nm to 10 nm assuming the case where the recording/reproducing operations would be carried out with the MR head kept at the flying height of 20 nm. As a result, glide defects were caused in a part of the glass substrates which were washed by the DI water with the content of Si being 30 ppb and then dried by the spin dry. The remaining glass substrates, which were washed by the DI water with the content of Si being 30 ppb and then dried by the spin dry, passed the glide test but later suffered malfunction in the reproducing operation due to the thermal asperity. On the other hand, for those glass substrates washed by the DI water with the content of Si being 20 ppb or less and dried by the spin dry, neither glide defects nor malfunction in the reproducing operation due to the thermal asperity were caused.

As described above, it is understood that, for those glass substrates to be used as the magnetic disks such that the recording and reproducing operations are carded out with the MR head kept at the flying height of 20 nm, the content of Si contained in the water used in the washing/drying step of the glass substrate is desired to be equal to 20 ppb or less. In this event, it is possible to obtain the glass substrate for a magnetic disk and the magnetic disk capable of reducing the flying height of the magnetic head and preventing the thermal asperity.

EXAMPLE 2-3

In the manner similar to Example 2-2 except that the surface of the glass substrate was subjected to hydrophilic treatment (specifically, silicofluoric acid treatment) before the pre-washing, a plurality of glass substrates were obtained. Evaluation was made of tho wettability of the surface of each substrate after the hydrophilic treatment. As a result, the contact angle was 4 to 8°.

The surface roughness (height of protrusions) of the substrate after the pre-washing was measured by the atomic force microscope. As a result, the surface roughness (height of protrusions) was reduced by about 5 to 10% as compared with Example 2-2. This is because, as a result of improvement in wettability of the surface of the substrate, water droplets of the DI water were spread and then dried so that the components forming the protrusions are dispersed.

The surface roughness (height of protrusions) of the substrate after the pre-washing was measured by the atomic force microscope. The result of measurement was shown in Table 2-3.

TABLE 2-3

| Content of Si | 5 ppb | 10 ppb | 20 ppb | 30 ppb |
|---|---|---|---|---|
| Surface Roughness after Hydrophilic Treatment (Rp) | 2.4–5.7 nm | 2.6–6.0 nm | 5.5–9.6 nm | 9.6–28.2 nm |

On each of opposite surfaces of the glass substrate, an NiAl seed layer, a CrV underlying layer, a CoCrPtB magnetic layer, a carbon protection layer, and a perfluoropolyether lubricant layer were formed to obtain a magnetic disk for use with a MR head.

Each of the magnetic disks obtained as mentioned above was subjected to a glide test. In the glide test, a minimum flying height of the magnetic head was varied from 18 nm to 10 nm assuming the case where the recording/reproducing operations would be carried out with the MR head kept at the flying height of 20 nm. As a result, glide defects were caused in a part of the glass substrates which were subjected to the washing/drying step using the DI water with the content of Si being 30 ppb, The remaining glass substrates, which were subjected to the washing/drying step using the DI water with the content of Si being 30 ppb, passed the glide test but later suffered malfunction in the reproducing operation due to the thermal asperity.

As described in Examples 2-1 through 2-3, the relationship between the content of Si contained in the water used in the washing/drying step and the height of the protrusions formed on the substrate is detected or grasped. Then, the allowable content of Si contained in the water is determined in accordance with the allowable height of the protrusions which will cause no hit or no recording/reproducing error when the slider is made to run afloat. In this manner, it is possible to reliably prevent the glide defect or the recording/reproducing error due to the thermal asperity. In these Examples, attention is directed to Si. Alternatively, consideration may be made of other elements such as C, Al, Fe, Cu, Zn, and Zr.

EXAMPLE 3-1

A plurality of disk-shaped glass substrates were prepared. Like in Example 2-1, a pair of principal surfaces of each glass substrate were subjected to precision-polishing to obtain the surface roughness represented by 5.3 nm<Rmax<9.3 nm, 0.6 nm<Ra<1.0 nm, and 2.8 nm<Rp<5.5 nm. Each of these glass substrates was dipped successively into washing baths of a neutral detergent and pure water with an ultrasonic wave applied to the washing baths. On the other hand, DI water was prepared by multiple repetition of ion exchange so that the content of Si is adjusted to 5 ppb, 10 ppb, 20 ppb, and 30 ppb. Thereafter, each glass substrate was dipped into the DI water and dried by the spin dry. Thus, glass substrates for magnetic disks were obtained as substrates after the spin dry. The content of Si in the DI water was measured by the absorption metric analysis (in the following description, the content of Si was measured in the same method).

In this example, Rmax, Ra, Rp, and Rv were measured by the atomic force microscope (AFM) and defined in JIS B0601 (Japanese Industrial Standard). In the following description, these values were measured in the same method. Rmax represents a maximum roughness height which is a distance from a highest peak of a roughness profile to a lowest valley in the vertical direction. Ra represents an average roughness which is an average of absolute values of deviations from a center line to the roughness profile. Rp represents the height of a highest peak, i.e., a distance from a mean line to the highest peak. Rv represents a height from the center line to a valley.

The surface of the glass substrate for the magnetic disk obtained as mentioned above was observed by a microscope and an electron microscope. As a result, it has been confirmed that semispherical protrusions having a size between about 1 μm and several μm were formed on those glass substrates which were washed using the DI water with the content of Si being 2- ppb and 30 ppb and then dried.

The protrusions were analyzed by EDS (Energy Dispersive X-ray Spectroscopy) to confirm that the protrusions mainly contained Si and O.

The protrusions were analyzed by TOF-SIMS (Time of Flight Secondary Ion Mass Spectrometry) to confirm that the protrusions contained SiOH as a main component.

Next, the protrusions were machined by FIB (Focus Ion Beam) to observe their sections with TEM (Transmission Electron Microscope). As a result, substances forming the protrusions were bright or dark as compared with the glass forming the substrate and were therefore assumed to have a low density. Thus, it has been confirmed that an interface was formed between the protrusions and the surface of the substrate.

Furthermore, the surface roughness (height of protrusions) of the substrate after the spin dry was measured by the atomic force microscope (AFM). The result is shown in Table 3-1.

The ratio Rp/Rv of the semispherical protrusions were measured by the atomic force microscope (AFM). The results are as follows.

| Content of Si in DI water | Rp/Rv |
|---|---|
| 5 ppb | 1.0–3.0 |
| 10 ppb | 2.1–3.5 |
| 20 ppb | 4.5–10 |
| 30 ppb | 10–55 |

From the above, it is understood that, if the ratio Rp/Rv is not smaller than 10, the protrusions due to the cleaning water containing Si may possibly be formed to cause the product defects.

Prior to deposition of a thin film such as a magnetic layer on each substrate after the spin dry, pre-washing was carried out by successively dipping the substrate into washing baths of a neutral detergent, DI water (the content of Si being 20 ppb), and IPA (isopropylalcohol) with an ultrasonic wave applied to the washing baths. Thereafter, the glass substrate was dried in IPA (steam dry tank). Thus, a plurality of glass substrates for magnetic disks were obtained as substrates after the IPA dry.

The surface roughness (height of protrusions) of the substrate after the IPA dry was measured by the atomic force microscope (AFM). The result is shown in Table 3-1.

TABLE 3-1

| Content of Si | | 5 ppb | 10 ppb | 20 ppb | 30 ppb |
|---|---|---|---|---|---|
| Surface Roughness (Rp) | After Spin Dry | 2.7–5.6 nm | 2.8–5.8 nm | 5.8–9.2 nm | 9.3–23.1 nm |
| | After IPA Dry | 2.9–5.7 nm | 3.0–5.9 nm | 6.0–9.5 nm | 10.5–24.2 nm |

As is obvious from Table 3-1, the surface roughness (height of protrusions) (Rp) of the substrate after the spin dry is greater with the increase in content of Si in the DI water in which the substrate was dipped before the spin dry. When the content of Si in the DI water is not greater than 20 ppb, the surface roughness (height of protrusions) (Rp) of the substrate is smaller than 10 nm. When the content of Si exceeds 20 ppb, the surface roughness (height of protrusions) (Rp) of the substrate is dramatically increased.

Since the IPA dry is used in the pre-washing step, the surface roughness (height of protrusions) (Rp) of the substrate is not increased. Specifically, even if the content of Si in the DI water used in the pre-washing step is equal to 20 ppb, the surface roughness (height of protrusions) (Rp) of the substrate is not increased in case of the IPA dry.

When the content of Si was equal to 5 ppb and 10 ppb, no protrusion was observed on the surface of the substrate. When the content of Si was equal to 20 ppb, the protrusions were formed but had a maximum height of 4 nm which did not cause any problem. Herein, the height of the protrusions is a true or net height exclusive of the surface roughness of the substrate itself. The total surface roughness including the net height of the protrusions and the surface roughness of the substrate itself is on the order of 9 nm as shown in Table 1.

Next, on each of opposite surfaces of the glass substrate after the pre-washing, an NiAl seed layer, a CrV underlying layer, a CoCrPtB magnetic layer, a carbon protection layer, and a perfluoropolyether lubricant layer were formed to obtain a magnetic disk for use with an MR head.

Each of the magnetic disks obtained as mentioned above was subjected to a glide test. In the glide test, a minimum flying height of the magnetic head was varied from 18 nm to 10 nm assuming the case where the recording/reproducing operations would be carried out with the MR head kept at the flying height of 20 nm. As a result glide defects were caused in a part of the glass substrates which were washed by the DI water with the content of Si being 30 ppb and then dried by the spin dry and which had Rp greater than 20 nm. The remaining glass substrates, which were washed by the DI water with the content of Si being 30 ppb and then dried by the spin dry, passed the glide test but later suffered malfunction in the reproducing operation due to the thermal asperity. On the other hand, for those glass substrates washed by the DI water with the content of Si being 20 ppb or less and dried by the spin dry and which had Rp smaller than 10 nm, neither glide defects nor malfunction in the reproducing operation due to the thermal asperity was caused.

As described above, for the glass substrate for use as the magnetic disk subjected to the recording and the reproducing operations with the MR head kept at the flying height of 20 nm, the height (Rp) of the protrusions formed on the glass substrate due to the presence of the impurities (C, Al, Si, Fe, Cu, Zn, Zr, and the like) contained in the water used in the washing/drying step is preferably smaller than 10 nm. In this event, it is possible to obtain the glass substrate for the magnetic disk as well as the magnetic disk which allow the reduction in flying height of the magnetic head and which prevent occurrence of the thermal asperity.

If the flying height of the head is reduced further, the height (Rp) of the protrusions formed on the glass substrate must be reduced further. As described above or as will later be described, the height of the protrusions can be controlled by controlling the content of Si in the DI water used as the cleaning water or the contact angle of water on the surface of the substrate.

EXAMPLE 3-2

A plurality of disk-shaped glass substrates were prepared. A pair of principal surfaces of each glass substrate were subjected to precision-polishing to obtain the surface roughness represented by 5.3 nm<Rmax<9.3 nm and 0.6 nm<Ra<1.0 nm. Each of these glass substrates was dipped successively into washing baths of a neutral detergent, DI water, DI water (content of Si being 30 ppb), and IPA (isopropylalcohol) with an ultrasonic wave applied to the washing baths. Thereafter, each glass substrate was dried by IPA (steam dry tank). Thus, a plurality of (25) glass substrates for magnetic disks were obtained as substrates after the IPA dry.

Although the content of Si in the DI water used in the washing step is equal to 30 ppb, no protrusions were formed because the IPA dry was used.

Thereafter, the glass substrates were put in a substrate case. The substrate case was packaged in a bag made of polyethylene (PE). After the interior of the bag was forcedly evacuated, the bag was seated by hot sealing. The glass substrates thus packaged were held for several days. The substrate case comprises an outer container made of polypropylene (PP) and an inner substrate holder made of polyethylene (PE) and releases a less amount of an organic gas or a less number of particles.

Thereafter, evaluation was made of the wettability of the substrates. As a result, the contact angle of water fell between 6 and 42°. The contact angle was highest for those substrates located at both sides of the substrate case and was decreased in the inner substrates. The contact angle of water was measured by the sessile drop method (in the following description, the contact angle of water was measured in the same method).

Prior to deposition of a thin film such as a magnetic layer on each glass substrate, the glass substrate was dipped into the DI water as pre-washing and dried by the spin dry, Thereafter, on each of opposite surfaces of the glass substrate, an NiAl seed layer, a CrV underlying layer, a CoCrPtB magnetic layer, a carbon protection layer, and a perfluoropolyether lubricant layer were formed to obtain a magnetic disk for use with a MR head.

As a result, the glide defects were high when the contact angle of water on the surface of the substrate exceeds 20°, as illustrated in FIG. 1. Those samples in which the contact angle of water on the surface of the substrate is about 10° or less are omitted from FIG. 1 because the glide test pass rate was equal to 100%. In FIG. 1, the abscissa represents the substrates having the contact angles of water represented by the right ordinate. The left ordinate represents the glide test pass rate while the right ordinate represents the contact angle of water on the surface of the substrate before dipping into the DI water and the spin dry. In FIG. 1, the glide test pass rate is given by a bar and the contact angle is given by a symbol "○".

Each of the magnetic disks obtained as mentioned above was subjected to a glide test. In the glide test, a minimum flying height of the magnetic head was varied from 18 nm to 10 nm assuming the case where the recording/reproducing operations would be carried out with the MR head kept at the flying height of 20 nm. As a result, glide failures were caused for those glass substrates having Rp greater than 20 nm. Even the glass substrates having passed the glide test later suffered malfunction in the reproducing operation due to the thermal asperity.

The protrusions were analyzed by EDS and TOF-SIMS. As a result, it has been confirmed that the protrusions contained SiOH as a main component, like in Example 3-1.

EXAMPLE 3-3

A plurality of disk-shaped glass substrates were prepared. A pair of principal surfaces of each glass substrate were subjected to precision-polishing to obtain the surface roughness represented by 5.3 nm<Rmax<9.3 nm, 0.6 nm<Ra<1.0 nm, and 2.8 nm<Rp<5.5 nm. Each of these glass substrates was dipped successively into washing baths of a neutral detergent and pure water with an ultrasonic wave applied to the washing baths. Thereafter, each glass substrate was dipped into the DI water with the content of Si adjusted to 30 ppb and dried by the spin dry. Thus, glass substrates for magnetic disks were obtained.

The semispherical protrusions formed on the surface of the glass substrate were measured by the atomic force microscope. As a result, Rp fell within the range between 15.1 and 24.6 nm.

The above-mentioned glass substrate was subjected to pre-washing by successively dipping the substrate into washing baths of a neutral detergent, DI water (the content of Si being 20 ppb), and IPA with an ultrasonic wave applied to the washing baths. Thereafter, the glass substrate was dried by IPA steam dry. Then, on each of opposite surfaces of the glass substrate, an NiAl seed layer, a CrV underlying layer, a CoCrPtB magnetic layer, a carbon protection layer, and a perfluoropolyether lubricant layer were formed to obtain a magnetic disk for use with an MR head.

Each of the magnetic disks obtained as mentioned above was subjected to a glide test at the minimum flying height of 30 nm. As a result, no glide defect was caused. Furthermore, the magnetic disks were subjected to the recording and reproducing operations with the MR head kept at the flying height of 40 nm. As a result, neither head crash nor malfunction in the reproducing operation due to the thermal asperity was caused.

From the above-mentioned results, it is understood that a desired content of Si in the DI water is changed if the flying height of the MR head from the surface of the magnetic disk is varied. It has been confirmed that a particular content of Si in the DI water did not cause any problem if the flying height of the MR head was 40 nm but was unacceptable if the flying height of the MR head was 20 nm.

This invention is not restricted to the above-mentioned Examples.

For example, the test condition of the glide test is not restricted to that mentioned above. Assuming that the recording and the reproducing operations are performed with the MR head running at the flying height less than 10 nm, the glide test may be performed while the minimum flying height of the magnetic head is varied from 0 nm to 10 nm.

The substrate may be made of a material other than the glass. For example, use may be made of aluminum, silicon, carbon, ceramics, titanium, and other various materials. The glass is not restricted in species and includes as chemically reinforced glass and a crystallized glass.

This invention is applicable not only to the substrate for the magnetic disk but also to a substrate for an optical disk or a magnetooptical disk.

The hydrophilic treatment may be carried out by alkali treatment using KOH, NaOH, or the like, acid treatment using diluted sulfuric acid, nitric acid, or the like, ozone oxidation by ultraviolet irradiation, and the like in addition to the above-mentioned technique.

The washing/drying step in this invention is not restricted to those described in conjunction with the Examples.

In this invention, the protrusions containing at least one of C, O, Al, Si, Fe, Cu, Zn, and Zr are not restricted to the protrusions produced through the washing/drying techniques and steps described in conjunction with Examples.

As described above, according to this invention, the contact angle of water on the surface of the substrate before the washing/drying step is the factor closely related to production of the protrusions containing at least one of C, O, Al, Si, Fe, Cu, Zn, and Zr and can be determined and controlled so that the product defects are avoided. Thus, the product defects can be avoided.

According to this invention, the content of at least one element of C, Al, Si, Fe, Cu, Zn, and Zr contained in the water used in the washing/drying step and causing the protrusions containing at least one of C, O, Al, Si, Fe, Cu, Zn, and Zr can be determined and controlled so that the product defects are avoided. Thus, the product defects can be avoided.

According to this invention, the height of the protrusions which are attached and formed on the surface of the substrate due to presence of the impurity elements (C, O, Al, Si, Fe, Cu, Zn, Zr, and the like) contained in the water used in the washing/drying step and which contain at least one of C, O, Al, Si, Fe, Cu, Zn, and Zr is controlled so that the products defects are avoided. Thus, the product defects can be avoided.

Specifically, the protrusions containing at least one of C, O, Al, Si, Fe, Cu, Zn, and Zr and/or the protrusions having a height causing a hit in the glide test or an error in the recording or the reproducing operation are not formed on the surface of the substrate even through the washing/drying step. Thus, it is possible to provide a substrate for a magnetic recording medium and a magnetic recording medium, which are capable of preventing the deterioration in recording/reproducing functions due to the thermal asperity. Similarly, it is possible to eliminate the negative factor causing a defect such as a recording or a reproducing error of an information recording medium.

What is claimed is:

1. A method of producing a substrate for an information recording medium, said method including a washing/drying step of washing and drying said substrate subjected to precision polishing, said method comprising the steps of:

obtaining a correlation between a contact angle of water on a surface of said substrate before said washing/drying step and a size of protrusions attached to the surface of said substrate during said washing/drying step; and controlling the contact angle of water on the surface of said substrate before said washing/drying step so that said protrusions have the size so as not to cause a hit when at least a recording layer is formed on the surface of said substrate to produce said information recording medium and when a slider provided with a recording device and/or a reproducing device is made to run on a surface of said information recording medium.

2. A method as claimed in claim 1, wherein said controlling step is for controlling the contact angle of water on the surface of said substrate before said washing/drying step so that said protrusions have the size so as not to cause said hit and so as not to cause an error upon recording and/or reproducing the information recording medium which is produced by forming at least said recording layer on the surface of said substrate.

3. A method of producing a substrate for an information recording medium, said method including a washing/drying step of washing and drying said substrate subjected to precision polishing, wherein:

a correlation is established between a contact angle of water on a surface of said substrate before said washing/drying step and a glide test fail rate in a glide test carried out by forming at least a recording layer on the surface of said substrate to produce said information recording medium and by causing a slider provided with a recording device and/or a reproducing device to run on a surface of said information recording medium;

the contact angle of water on the surface of said substrate having a value such that the glide test does not result in failure.

4. A method as claimed in claim 3, wherein:

an additional correlation is also established between the contact angle of water on the surface of said substrate before said washing/drying step and an error rate where recording and/or reproducing are carried out for the information recording medium produced by forming at least said recording layer on the surface of said substrate;

the contact angle of water on the surface of said substrate having a value such that the glide test does not result in failure and that a recording error and/or a reproducing error are not caused when the recording and/or the reproducing are carried out for the information recording medium produced by forming at least said recording layer on the surface of said substrate.

5. A method of producing an information recording medium, said method including the steps of preparing a substrate subjected to precision polishing, washing and drying said substrate before depositing a film thereon, and forming at least a recording layer on said substrate after said washing and drying step, said method comprising the steps of:

obtaining a correlation between a contact angle of water on a surface of said substrate before said washing and drying step and a size of protrusions attached to the surface of said substrate during said washing and drying step; and controlling the contact angle of water on the surface of said substrate before said washing and drying step so that said protrusions have the size so as not to cause a hit when at least said recording layer is formed on the surface of said substrate to produce said information recording medium and when a slider provided with a recording device and/or a reproducing device is made to run on a surface of said information recording medium.

6. A method as claimed in claim 5, wherein said controlling step is for controlling the contact angle of water on the surface of said substrate before said washing and drying step so that said protrusions have the size so as not to cause said hit and so as not to cause an error upon recording and/or reproducing the information recording medium which is produced by forming at least said recording layer on the surface of said substrate.

7. A method of producing an information recording medium, said method including the steps of preparing a substrate subjected to precision polishing, washing and drying said substrate before depositing a film thereon, and forming at least a recording layer on said substrate after said washing and drying step, wherein:

a correlation is established between a contact angle of water on a surface of said substrate before said washing and drying step and a glide test fail rate in a glide test carried out by forming at least said recording layer on the surface of said substrate to produce said information recording medium and by causing a slider provided with a recording device and/or a reproducing device to run on a surface of said information recording medium;

the contact angle of water on the surface of said substrate having a value such that the glide test does not result in failure.

8. A method as claimed in claim 7, wherein:

an additional correlation is also established between the contact angle of water on the surface of said substrate before said washing and drying step and an error rate where recording and/or reproducing are carried out for the information recording medium produced by forming at least said recording layer on the surface of said substrate;

the contact angle of water on the surface of said substrate having a value such that the glide test does not result in failure and that a recording error and/or a reproducing error are not caused when the recording and/or the reproducing are carried out for the information recording medium produced by forming at least said recording layer on the surface of said substrate.

9. A method of producing a substrate for an information recording medium, said method including a washing/drying step of washing and drying said substrate subjected to precision polishing, said method comprising the steps of:

preliminarily obtaining a correlation between a content of at least one element of C, Al, Si, Fe, Cu, Zn, and Zr contained in water used in said washing/drying step and a size of protrusions attached to a surface of said substrate during said washing/dying step; and determining the content of said at least one element contained in the water used in said washing/drying step so that said protrusions have the size so as not to cause a hit when at least a recording layer is formed on the surface of said substrate to produce said information recording medium and when a slider provided with a recording device and/or a reproducing device is made to run on a surface of said information recording medium.

10. A method as claimed in claim 9, wherein said determining step is for determining the content of said at least one element contained in the water used in said washing/drying step so that said protrusions have the size so as not to cause said hit and so as not to cause an error upon recording and/or reproducing the information recording medium which is produced by forming at least said recording layer on the surface of said substrate.

11. A method of producing a substrate for an information recording medium, said method including a washing/drying step of washing and drying said substrate subjected to precision polishing, wherein:

a content of at least one element of C, Al, Si, Fe, Cu, Zn, and Zr contained in water used in said washing/drying step is equal to 20 ppb (parts per billon) or less.

12. A method of producing an information recording medium, said method including the steps of preparing a substrate subjected to precision polishing, washing and drying said substrate before depositing a film thereon, and forming at least a recording layer on said substrate after said washing and drying step, said method comprising the steps of:

preliminarily obtaining a correlation between a content of at least one element of C, Al, Si, Fe, Cu, Zn, and Zr contained in water used in said washing and drying step and a size of protrusions attached to a surface of said substrate during said washing and drying step; and determining the content of said at least one element contained in the water used in said washing and drying step so that said protrusions have the size so as not to cause a hit when at least a recording layer is formed on the surface of said substrate to produce said information recording medium and when a slider provided with a recording device and/or a reproducing device is made to run on a surface of said information recording medium.

13. A method as claimed in claim 12, wherein said determining step is for determining the content of said at least one element contained in the water used in said washing/drying step so that said protrusions have the size so as not to cause said hit and so as not to cause an error upon recording and/or reproducing the information recording medium which is produced by forming at least said recording layer on the surface of said substrate.

14. A method of producing an information recording medium, said method including the steps of preparing a substrate subjected to precision polishing, washing and drying said substrate before depositing a film thereon, and forming at least a recording layer on said substrate after said washing and drying step, wherein:

the content of said at least one element of C, Al, Si, Fe, Cu, Zn, and Zr contained in water used in said washing and drying step is equal to 20 ppb (parts per billion) or less.

* * * * *